United States Patent
Mast et al.

[11] 3,767,306
[45] Oct. 23, 1973

[54] METHOD AND APPARATUS FOR DETECTING DUST PARTICLES BY PARTIAL EMBEDMENT IN A LAYER WHOSE SURFACE IS DEFORMED BY THE PARTICLES AND MEASURING RADIATION SCATTERED BY THE PARTICLES WITH A SCHIEREN OPTICAL SYSTEM

[75] Inventors: Fred Mast, Zuzwil/Sg; Renato Rossi, Zurich; Ulrich La Roche, Zurich; Jean A. Knus, Zurich, all of Switzerland

[73] Assignee: Gretag Aktiengesellschaft, Regensdorf, Switzerland

[22] Filed: Feb. 9, 1972

[21] Appl. No.: 224,721

[30] Foreign Application Priority Data
Feb. 17, 1971 Switzerland.................... 2314/71

[52] U.S. Cl........ 356/102, 250/222 PC, 235/92 PC, 356/38, 356/129, 356/208
[51] Int. Cl...................... G01n 15/02, G01n 21/46
[58] Field of Search....................... 356/36, 38, 102, 356/103, 104, 120, 129, 207, 210, 212; 250/222 PC, 218; 235/92 PC; 350/13

[56] References Cited
UNITED STATES PATENTS

| | | | |
|---|---|---|---|
| 2,918,216 | 12/1959 | Shapiro............................ | 235/92 PC |
| 2,950,648 | 8/1960 | Rhodes, Jr........................ | 350/13 |
| 2,977,847 | 4/1961 | Meyer-Arendt.................. | 350/13 |
| 3,335,413 | 8/1967 | Glenn, Jr......................... | 350/161 |
| 2,850,239 | 9/1958 | Polanyt et al.................... | 235/92 PC |
| 3,526,461 | 9/1970 | Lindahl et al.................... | 356/38 |
| 2,604,809 | 7/1952 | Mitchell........................... | 356/120 |

OTHER PUBLICATIONS

"The Measurement of Unresolved Single Particles .... Phase Microscope"; Osterberg et al.; JOSA; Vol. 40 No. 2, Feb. 50; pg. 64–72

*Primary Examiner*—Ronald L. Wibert
*Assistant Examiner*—V. P. McGraw
*Attorney*—Ralph E. Parker et al.

[57] ABSTRACT

A method and apparatus for detecting and measuring the number and/or size of dust particles on a support plate having a planar surface. The method comprising flowing a liquid layer over the support to wet the particles and controlling the layer thickness so that particles form deformations in the layer surface due to surface tension of the liquid and then measuring, by means of a Schlieren or phase contrast optical system, the amount of light scattered by those particles causing the deformations. The measured intensity is then compared with calibration curves derived empirically from measurements of dust particles of known size embedded in liquid layers of different known thicknesses to determine the number and/or size of the particles under measurement. The apparatus comprises a dust proof chamber into which the support plate with the particles embedded in a liquid layer is introduced, the chamber including a light source for illuminating the liquid layer and a Schlieren optical system for measuring the light scattered from the particles. The optical system includes a photoelectric transducer which is connected to an evaluation system not forming part of the housing to provide an indication of the number and/or size of the particles under measurement.

16 Claims, 3 Drawing Figures

METHOD AND APPARATUS FOR DETECTING DUST PARTICLES BY PARTIAL EMBEDMENT IN A LAYER WHOSE SURFACE IS DEFORMED BY THE PARTICLES AND MEASURING RADIATION SCATTERED BY THE PARTICLES WITH A SCHIEREN OPTICAL SYSTEM

FIELD OF INVENTION

This invention relates to a method of detecting particles, for example dust particles, in which the particles are deposited on a support, the support together with the deposited particles being brought into the path of a beam of radiation and the light scattered by the particles being detected by an optical system.

PRIOR ART

Known methods of this kind in which the optical system includes a viewing system and a light source for illuminating the support for the dust particles, can give information solely as to the quantity of scattered light, and not the number and size of the dust particles. It is also known to scan the support with a microscope to determine the number and size of the dust particles but this method is extremely time-consuming and complicated.

BRIEF SUMMARY OF THE INVENTION

The invention seeks to overcome these disadvantages by embedding the particles in a layer of liquid whose thickness is less than the maximum height of the deposited particles, and interposing the layer containing the embedded particles as a light control layer in a Schlieren or phase contrast optical system.

The layer or film used for embedding the particles need be liquid only during the embedding operation and should have maximum wetting power in the liquid phase. The embedding substance may be in a solid phase or be brought into such a phase before and/or after the embedding operation. The particles affect the measurement made by the optical system only if they deform or break through the surface of the layer of liquid, i.e., if their height is greater than the thickness of the layer of liquid. The size of the particles can thus be determined by variation of the thickness of the layer of liquid.

The invention further relates to apparatus for performing the above method, and comprises a plate-shaped support for the particles, a source of radiation, means for spreading a layer of liquid on the support, and means for introducing the support together with the layer of liquid and particles embedded therein as a light control layer into the path of the radiation produced by said source so that the radiation reflected from said particles is measured by a phase contrast optical system.

BRIEF DESCRIPTION OF THE DRAWINGS

A preferred embodiment of the invention will now be explained in detail with reference to the accompanying drawings wherein.

DETAILED DESCRIPTION OF THE PREFERRED EMBODIMENT

Figure 1:
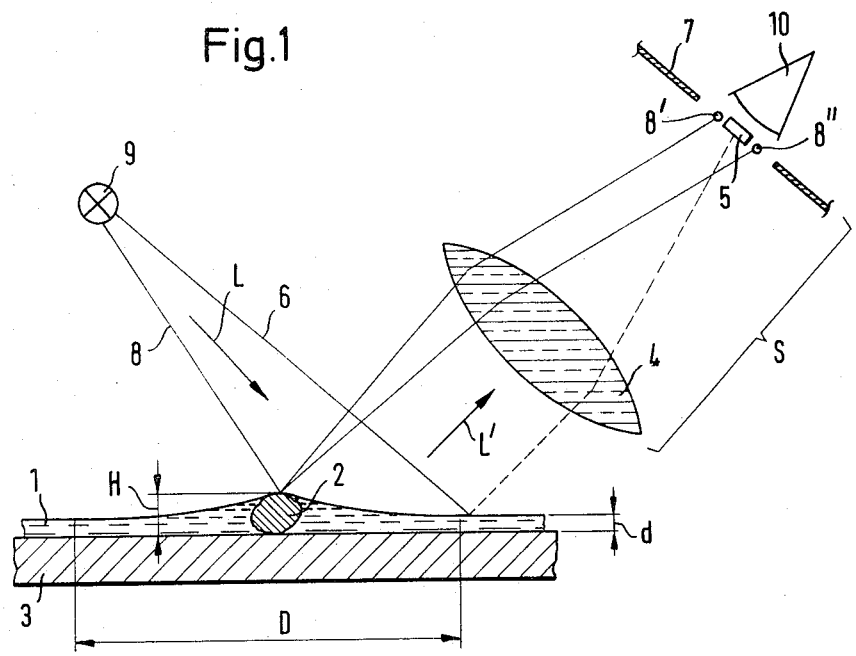
FIG. 1 illustrates a method of detecting particles in accordance with the invention.

Referring to FIG. 1, a film 1 of a wetting agent is spread over a support 3. The film of liquid 1 is illuminated by a light source 9. The beam of light L bounded by the rays 6 and 8 is reflected by the surface of the film of liquid. The reflected beam L' is directed towards the pupil 7 of an optical viewing system 10 by means of a Schlieren optical system S including a lens 4 and a bar and slot system 5. This arrangement is very sensitive to dust particles having a height H greater than the film thickness d. FIG. 1 shows a dust particle 2 embedded in the film of liquid 1. After being wetted by the liquid, the dust particle 2 produces a surface deformation in the deposited film as a result of surface tension, the deformation around the particle 2 having a diameter D which is considerably greater than the height H of the dust particle.

The position of the support 3 relative to the optical system S and the light source 9 is arranged so that those rays, for example the ray 6, which are incident to undeformed parts of the film of liquid 1 are reflected on to the bar 5 of the Schlieren optical system and are masked by that bar. These rays 6 do not therefore reach the viewing system 10. In contradistinction thereto, those rays, for example the ray 8, which are incident to the zone of the film of liquid 1 deformed by the dust particle 2 and are thus reflected past the bar 5. In the viewing system 10, these rays 8 appear as diffraction images 8' and 8'' in the form of bright strips outside the bar 5 and symmetrical thereto.

A thin mirror coating applied to the support 3 may alternatively be used to reflect the rays emitted by the light source 9. The Schlieren optical system may also be so arranged that it is not the rays reflected by the layer of liquid that are viewed, but the rays which pass through the layer of liquid. The dust particle light scatter effect, which is known per se, is considerably amplified by the interaction between dust particles and the wetting layer of liquid and by the resulting deformations occurring at the surface of the liquid. The amplification factor is about $10^4$ to $10^6$.

The diffraction spectrum of the surface deformations of the layer of liquid 1 produced by the dust particles appears in the plane of the pupil 7 of the viewing system. These surface deformations would appear as spots of light to the eye direct, i.e. by viewing the layer of liquid 1 through the viewing system 10 without the interposition of the Schlieren optical system. S. The larger the surface deformations, the brighter these spots of light; the more surface deformations there are, the more spots of light there are. The total brightness in the plane of the pupil 7 is thus a direct indication of the number and/or size of the embedded dust particles. The intensity of the scattered light produced by each surface deformation of diameter D as a result of an embedded dust particle of height H is approximately proportional to the square of half the diameter of the deformation. Practical experiments have shown that the ratio of the square of half the diameter of the deformation to the square of the height of the dust particle is approximately $10^4$ to $10^6$ : 1, i.e., there is an effective amplification of the scattered light of $10^4$ to $10^6$ as a result of the deformation of the layer of liquid. This increased amount of scattered light is measured by the Schlieren optical system.

Figure 2:
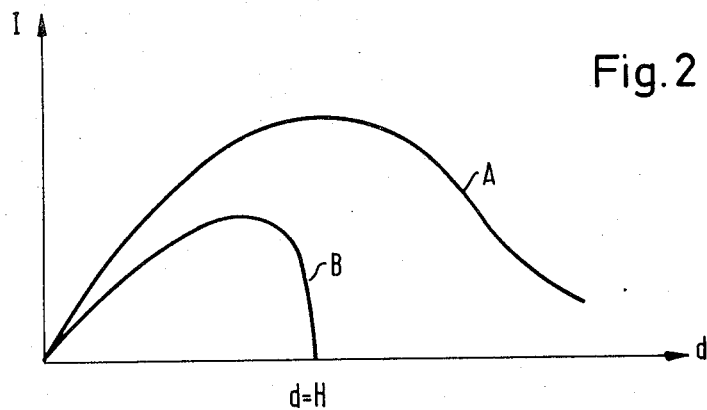
FIG. 2 is a graph of intensity of light received by the optical system shown in FIG. 1 versus depth of liquid on the support.

With a dust particle of given height H and a liquid thickness $d$ of zero, the diameter D of the deformation of the liquid surface — and hence the scattered light intensity I — is also zero, increases with increasing layer thickness, reaches a maximum value, and returns to zero for $d = H$. This relationship is shown by curve B in FIG. 2. When dust particles of different sizes are deposited on the support 3, the scattered light intensity I increases with increasing liquid layer thickness, also reaches a maximum value, and then drops again. This relationship is shown by the curve A in FIG. 2. If the thickness of the layer of liquid is known, the size of the dust particles can be deducted from the total scattered light intensity. Since the scattered light intensity is directly proportional to the number and/or brightness of the spots of light appearing to the eye viewing the layer of liquid 1 directly — i.e., without the bar 5 — the size and number of dust particles can readily be obtained by counting the number of spots of light for different layer thicknesses $d$. Each count gives the number of those particles whose height H is greater than the layer thickness $d$. This somewhat tedious method can be automated by using electronic scanners. Since scanners of this kind are very expensive, the following discloses a preferred method by means of which the size and number of the dust particles — i.e., their distribution curve — can be determined more easily and cheaply. This method makes use of the relationship shown in FIG. 2 between the scattered light intensity I, the layer thickness $d$ and the number and the size of the dust particles.

The equation :

$$I(d) = \int_0^\infty z(H)L(H,d)dH$$

applies to the measured total scattered light of intensity $I$; H denoting the maximum particle height, $z(H)$ the particle density in the height interval $dh$ and $L(H,d)$ denotes the intensity of the scattered light from a particle of height H against the layer thickness $d$. If the functions $L(H,d)$ are known, the above equation can be solved with respect to $z(H)$ by measuring the total scattered light intensity $I$ for different layer thicknesses $d$, i.e., by determining the function $I(d)$. The functions $L(H,d)$ are determined by measuring the scattered light intensity from particles of known height for different layer thicknesses.

Thus by measuring the scattered light as a function of the thickness of the layer of liquid it is possible to obtain the number of dust particles as a function of their size provided that the scattered light intensity is known per particle of a given size as a function of the layer thickness. The scattered light intensity per particle of a given size for different layer thicknesses is determined by coating a calibration plate having elevations of a specific height at specific places with layers of liquid each of a different thickness and measuring the total scattered light intensity for each layer thickness. A group of calibration curves can be obtained in this way, and will have a similar appearance to the curve B in FIG. 2. These calibration curves may be fed as functions to a computer which solves the above equation by reference to these calibration curves, and to the layer thicknesses and the intensities of the particles being examined. The layer thicknesses can be determined by an interferometer or they can alternatively be readily determined when the layer of liquid is applied to the support. This latter method is possible, for example, if an applicator bar mounted for parallel displacement at a predetermined distance from the support 3 is used for applying the layer. In these conditions, the liquid is moved across the support into the space between the support and the applicator bar. It is known that the resulting layer thickness is dependent upon the different material constants of the liquid, the speed of movement of the applicator bar, and the geometry of the liquid meniscus forming between the support and the applicator bar. Thus, for example, to apply layers of liquid of different thicknesses either the distance between the support and the applicator bar can be kept constant and the speed of the applicator bar varied, or else the speed can be kept constant and the distance varied. The layer thickness is in every case calculable or empirically determinable.

Figure 3:
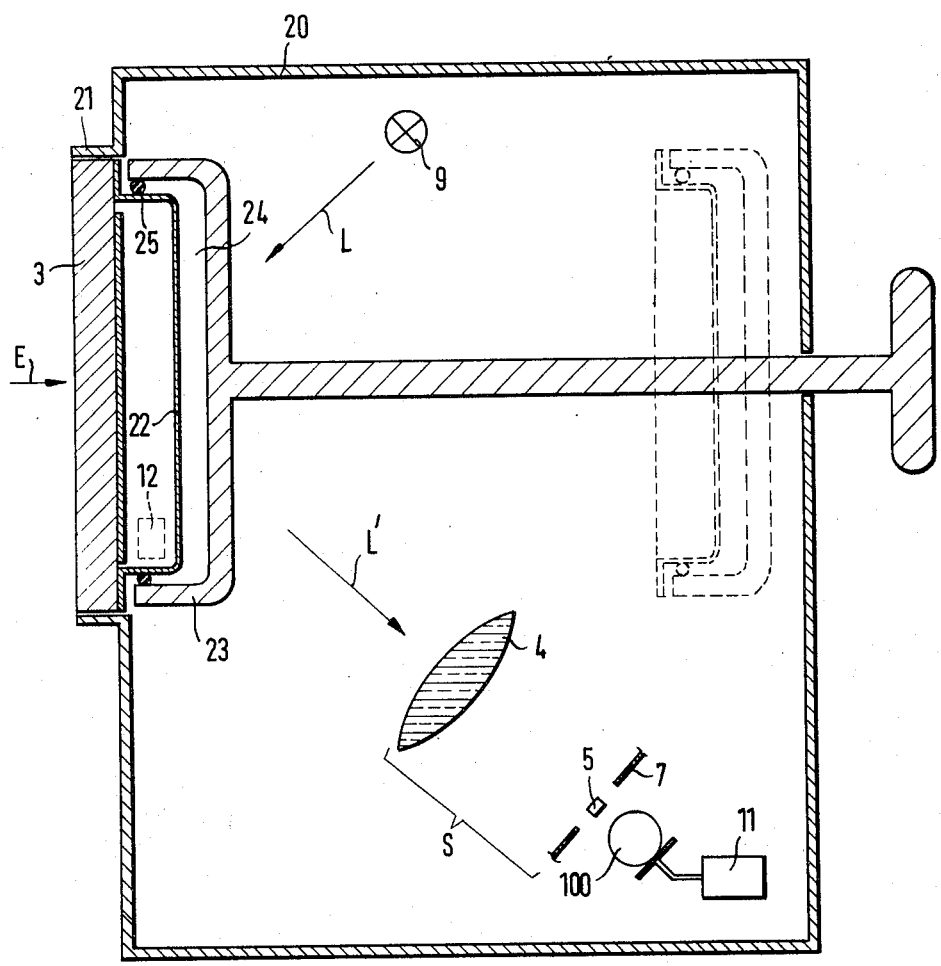
FIG. 3 is a sectional view of the apparatus according to the invention.

The apparatus shown in FIG. 3 comprises a housing 20 containing the light source 9, the Schlieren optical system S (FIG. 1) and a photoelectric transducer 100 behind the pupil 7 and the bar 5 of the Schlieren optical system, an electronic evaluating system 11 being connected to the transducer 100. The housing 20 has a projection 21 into which the plate-shaped support 3 together with the dust particles deposited thereon can be slid in the direction of arrow E. The support plate 3 is connected to a cover 22 so as to be dust-tight, for example is glued thereto. After the support 3 has been inserted into the projection 21, the cover 22 is withdrawn from the support 3, for example by means of a plunger 23 slidably mounted in the housing 20. In the exemplified embodiment illustrated, the space 24 between the inner surface of the plunger and the cover 22 is sealed by means of an O-ring 25, so that the cover can be removed from the support plate 3 by evacuation of the space 24. The plunger 23 together with the cover adhering thereto is then brought into the position shown in broken lines. Removal of the cover has the advantage that its outer surface, which is usually not dust-free, adheres to the plunger inner surface so that the dust particles on the outer surface of the cover are not liberated in the housing 20 where they might impair the measurement. After removal of the cover, the support plate 3 is coated with a liquid having a viscosity between 2 and 6 centipoises by an applicator bar 12, different layer thicknesses being applied step-by-step. Alternatively the support plate 3 can be coated with liquid just once during a measuring operation, namely with a layer of liquid of the maximum required thickness, and then the thickness of the layer can be reduced either by mounting the support vertically and allowing the layer of liquid to flow away, or by mounting the support horizontally and allowing the layer of liquid to evaporate. In either case, however, the thickness of the layer of liquid must be determined, this being possible in known manner, for example by an interferometer or by the support plate 3 containing calibration particles of known size at predetermined points. Particularly suitable liquids are oils, more particularly silicone oils. The support plate 3 is any substrate having an optically plane surface.

A variant of the above-described embedding of the dust particles in the liquid has proved particularly advantageous for practical performance of the method described. In this variant, the support 3 for the dust particles is constructed in the form of a cassette which can be slid into the apparaus shown in FIG. 3 after the dust particles have been applied. A layer of a thermoplastic material of predetermined thickness is disposed on that surface of the support on which the dust particles are to be collected. After the dust particles have been deposited on this layer, the support together with the thermoplastic layer is heated, the latter becoming liquid and wetting the dust particles. After cooling of the support, the layer of liquid solidifies so that any particles of dust applied subsequently — for example unintentionally — can no longer subject the surface to deformation and the closed cassette can be stored for any length of time.

The advantage of the method described over known methods comprises the amplification of $10^4$ to $10^6$ as compared with direct scattered light measurements, this effect being due to the surface deformation of the layer of liquid, and the possibility of exact measurement of the size of the dust particles, since the only particles that give rise to surface deformations are those whose diameter is larger than the thickness of the layer of liquid.

The method according to the invention and the systems operating in accordance therewith may be used preferably wherever information is required concerning the presence of solid particles in a gaseous medium. The dust suspended in space is not measured directly; instead, it is the dust deposited on a support in a given interval of time. Measurements of this kind are used more particularly for monitoring areas which are to be kept as dust-free as possible.

What is claimed is:

1. A method of detecting particles comprising the steps of depositing the particles on the surface of a support member, wetting the particles by flowing a liquid layer over said surface, the depth of said layer being less than the maximum height of said particles, projecting a beam of radiation onto said layer and measuring the radiation scattered by said particles by means of a Schlieren optical system.

2. A method according to claim 1, including empirically determining the relationship between different quantities of scattered radiation measured by said optical system for different predetermined number of particles of a given size embedded in layers of different thicknesses and relating the measurements to the scattered radiation received by said optical system from a layer having particles embedded therein to determine the number of particles and their size.

3. A method according to claim 2, including mounting said support member horizontally, allowing the liquid to evaporate and measuring the radiation scattered by said particles at different predetermined thicknesses of said layer as said liquid evaporates.

4. A method according to claim 1 wherein the step of wetting the particles on the surface of said support member is performed by flowing the liquid layer over said surface after the particles have been deposited on said surface.

5. A method according to claim 1 wherein the step of wetting the particles on the surface of said support member is performed by flowing a layer of liquid over the surface and which has a viscosity within the range of from 2 to 6 centipoises.

6. A method according to claim 1 wherein the step of wetting the particles on the surface of said support member is performed by flowing a layer of silicone oil over the surface.

7. A method according to claim 1 wherein the step of wetting the particles on the surface of said support member is performed by coating said surface with a layer of thermoplastic material, heating said thermoplastic layer subsequent to deposition thereon of the particles to be detected to a temperature sufficient to liquify the layer and wet the particles, and then permitting the layer to cool and re-solidify.

8. Apparatus for detecting particles comprising a source of radiation, a Schlieren optical system for receiving radiation, a support member, a layer formed on a surface of said member to receive and wet dust particles, and means for positioning said support member relative to said source and said optical system so that said layer acts as a radiation controlling layer for said optical system.

9. Apparatus according to claim 8, including means for spreading a liquid layer over the surface of said support member to wet dust particles deposited thereon.

10. Apparatus according to claim 8, wherein said layer is of thermoplastic material.

11. Apparatus for detecting particles comprising a housing, a light source and a Schlieren optical system within said housing, a support member having a planar surface, means for introducing said surface into said housing and means for applying a liquid layer to said surface to wet particles thereon, said optical system being positioned relative to said layer and said source so that light scattered by the deformations caused by the particles in said layer is measured by said optical system.

12. Apparatus according to claim 11, wherein said optical system includes a photoelectric device for receiving light scattered by said particles and said apparatus further includes an evaluating system coupled to said photoelectric device for determining the number of particles of a predetermined size.

13. A method of detecting particles comprising the steps of embedding said particles in a substance lying on the surface of a support member whilst said substance is in a liquid phase, the depth of said liquid substance being less than the maximum height of said particles, projecting light into the surface of said substance and measuring by means of a Schlieren optical system the variation in the intensity of light resulting from deformations in the surface of said substance caused by said particles.

14. A method according to claim 13 wherein the step of embedding said particles in the substance is performed by use of a substance which is normally in a liquid phase.

15. A method according to claim 13 wherein the step of embedding said particles in the substance is performed by coating the surface of said support member with a layer of thermoplastic material and heating said thermoplastic layer subsequent to deposition thereon of the particles to be detected to a temperature sufficient to liquify the layer.

16. A method according to claim 13 wherein the step of measuring the variation in intensity of light resulting from deformation in the surface of said substance caused by said particles is performed by projecting the light through the substance and the support member to said Schlieren optical system.

* * * * *